UNITED STATES PATENT OFFICE.

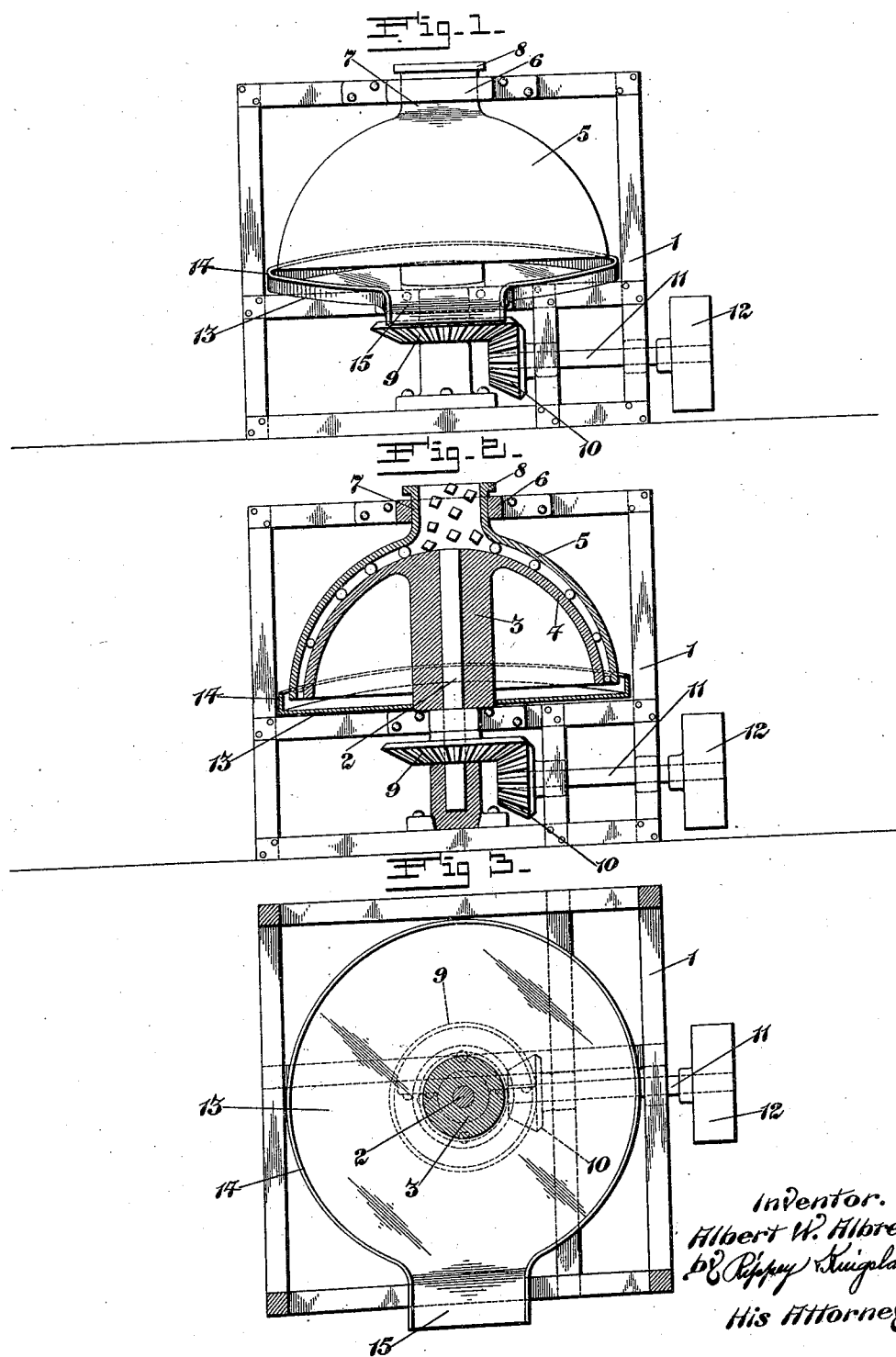

ALBERT W. ALBRECHT, OF ST. LOUIS, MISSOURI.

APPARATUS FOR THE MANUFACTURE OF METALLIC BALLS.

1,419,599.　　　　　　Specification of Letters Patent.　Patented June 13, 1922.

Application filed March 14, 1921. Serial No. 452,300.

*To all whom it may concern:*

Be it known that I, ALBERT W. ALBRECHT, a citizen of the United States, residing at the city of St. Louis and State of Missouri, have invented a new and useful Improvement in Apparatus for the Manufacture of Metallic Balls, of which the following is a specification.

This invention relates to apparatus for the manufacture of metallic balls.

An object of the invention is to provide a novel and efficient machine for making metallic balls.

Another object of the invention is to provide a machine for making metallic balls with smooth surfaces.

Another object of the invention is to provide a machine comprising a pair of rotary members arranged to receive metallic blocks or bodies between them and to roll said blocks or bodies into balls having smooth surfaces, as distinguished from balls having protrusions like those remaining on the balls produced by casting or by mechanisms heretofore employed.

Other objects will appear from the following description, reference being made to the drawing in which—

Fig. 1 is an elevation of a machine embodying the present invention.

Fig. 2 is a vertical sectional view.

Fig. 3 is a plan view of the table on which the balls are discharged after they have been completed.

In the embodiment shown my invention comprises a frame 1 supporting the operating mechanism.

A vertical shaft 2 is journaled for rotation in the frame and is arranged to operate one of the parts between which the balls are passed during the rolling operation. The part which is operated by the shaft 2 comprises a hub 3 attached to the shaft and a head 4 having a convex upper surface. The upper surface of the head 4 is made perfectly smooth throughout when it is desired to produce balls having smooth surfaces.

The cooperating member 5 has a concave surface and is mounted for axial and rotary movements in a bearing 6 supported by the frame 1. When it is desired to make balls with smooth surfaces the concave surface of the member 5, which concave surface is adjacent the smooth convex surface of the head 4, is made perfectly smooth. The member 5 has an axial extension 7 journaled in the bearing 6 and permitting axial and rotary movements of the member 5 relative to the head 4. Axial and rotary movements are imparted to the member 5 by the metallic blocks or bodies passing between said member and the head 4 when said head 4 is rotated as hereinafter explained. The extension 7 is provided with a circumferential flange 8 on its upper end arranged to support the member 5 on the bearing 6.

The extension 7 has a passage therethrough to permit the metallic bodies or blocks, from which the balls are to be rolled, to be deliveerd onto the upper end of the head 4 from which point of delivery the balls pass between the head 4 and the member 5 and are rolled into smooth spherical balls.

The shaft 2 is provided with a gear 9 meshing with a gear 10 on a drive shaft 11 which may be rotated by any appropriate source of power applied to the pulley 12.

The metallic blocks or bodies to be rolled into spherical form, if they are of material that is too hard to be yieldable are heated, and are fed to the machine through the passage in the member 5 as shown in Fig. 2. The heated blocks or bodies pass between the head 4 and the member 5 and, under the impulse of centrifugal force and gravity, pass downwardly between said parts. The member 5 presses upon the blocks or bodies being rolled so that a rolling action is obtained which, because of the curvature of the surfaces between which the balls pass, results in the formation of perfectly smooth surfaced spherical balls. The radial width of the space between the head 4 and the member 5 gradually decreases toward the lower or discharge end of said spaces so that the balls discharged will be produced under pressure and with perfectly smooth surfaces.

The balls are discharged onto an inclined table 13 having a circumferential flange 14 to prevent the balls from dropping from the table and having a discharge passage 15 at one side.

From the foregoing it will be understood that my invention serves all of its intended purposes. Since the balls are rotated to bring all peripheral surfaces thereof into contact with the smooth rolling surfaces of the head 4 and the member 5, with the result that pressure is applied to all peripheral surfaces of the balls, the balls will be produced with perfectly smooth surfaces as distinguished from balls that have heretofore been produced by casting or by other machines.

I do not restrict myself to unessential features but what I claim and desire to secure by Letters Patent, is:—

1. A machine of the character described, for the purpose of hot or cold rolling balls, comprising a rotary convex head, and a concave pressure member enclosing the head and being supported for axial and rotary movements.

2. A machine of the character described, for the purpose of hot or cold rolling balls, comprising a rotary convex head, and mechanism for rotating said head, in combination with a concave member enclosing the head, a passage for delivery of blocks or bodies between the member and the head, and a support in which said member is mounted for axial and rotary movements relative to the head.

3. A machine of the character described, for the purpose of hot or cold rolling balls, comprising a rotary convex head, a concave member enclosing said head and supported for axial and rotary movements relative to the head to admit the bodies to be rolled between the head and said member, and a table arranged to receive the balls produced by the operation of said parts.

4. A machine of the character described, for the purpose of hot or cold rolling balls, comprising a rotary convex head, a concave member enclosing the head, a support in which the concave member is mounted for axial movements relative to the head to permit bodies to pass between said member and said head and arranged to apply pressure to the bodies on the head, and mechanism for rotating said head.

5. A machine of the character described, for the purpose of hot or cold rolling balls, comprising a rotary axially immovable convex head, a rotary and axially movable concave member enclosing the convex surface of the head, supports in which said head and said member are mounted for said movements, and mechanism for rotating one of said parts.

6. A machine of the character described, for the purpose of hot or cold rolling balls, comprising a frame, a convex head mounted for rotation in said frame, a concave member enclosing said head and supported by said frame for movement toward and away from said head, a table arranged to receive the balls discharged from between said head and said member, and mechanism for rotating said head.

7. A machine of the character described, for the purpose of hot or cold rolling balls, comprising a rotary axially immovable convex head, a rotary and axially movable concave member enclosing the head, mechanism for rotating said head, a table supported in position to receive balls discharged from between said head and said member, and a discharge passage from said table.

ALBERT W. ALBRECHT.